United States Patent [19]
Aiyama

[11] Patent Number: 5,697,258
[45] Date of Patent: Dec. 16, 1997

[54] OPERATION LEVER MECHANISM FOR HANDLE

[75] Inventor: Fumihiko Aiyama, Tokyo, Japan

[73] Assignee: Kioritz Corporation, Tokyo, Japan

[21] Appl. No.: 594,834

[22] Filed: Jan. 30, 1996

[30] Foreign Application Priority Data

Jan. 31, 1995 [JP] Japan .................. 7-013642

[51] Int. Cl.$^6$ .................. A01G 3/053; G05G 1/00
[52] U.S. Cl. .................. 74/491; 74/523; 192/131 R; 30/216
[58] Field of Search ............ 74/491, 523; 83/DIG. 1; 30/216; 200/337, 573; 192/131 R

[56] References Cited

U.S. PATENT DOCUMENTS

| | | | |
|---|---|---|---|
| 2,198,469 | 4/1940 | Woodward | 74/554 |
| 4,378,637 | 4/1983 | Kieser et al. | |
| 4,898,039 | 2/1990 | Aiyama et al. | 30/216 X |
| 5,145,044 | 9/1992 | Kramer et al. | 192/131 R |

FOREIGN PATENT DOCUMENTS

| | | | |
|---|---|---|---|
| 235995 | 12/1959 | Australia | 137/636.4 |
| 35 31 059 | 3/1987 | Germany | |
| 42 22 318 | 1/1993 | Germany | |
| 777316 | 11/1980 | U.S.S.R. | 137/636.4 |

*Primary Examiner*—Charles A. Marmor
*Assistant Examiner*—Troy Grabow
*Attorney, Agent, or Firm*—Armstrong, Westerman, Hattori, McLeland & Naughton

[57] ABSTRACT

The present invent provides an improvement in the handling and operation of portable working machines, particularly in a loop front handle and an operation lever adjacent to the handle for easy operation. An operation lever mechanism for a handle according to the present invention includes: a rotatably supported body; a swingable operation lever pivotally supported by the rotatably supported body; and an operating portion movable in a direction along an axis X—X of the rotatably supported body, the operating portion connected to a swinging end of the operation lever, wherein the rotation axis X—X of the rotatably supported body is situated so as to encompass a virtual center X of a loop handle or a point adjacent to the center X, and the grip portions of second swinging end of the swingable operation lever rotate and move along an arc of the loop handle.

17 Claims, 6 Drawing Sheets

OPERATION LEVER MECHANISM FOR HANDLE

BACKGROUND OF THE INVENTION

1. Field of the Invention

The present invention relates to an operation lever mechanism for the handle of a working machine, and more particularly to that of a portable working machine such as a trimmer, a mower or a chain saw.

2. Description of the Related Art

A conventional portable working machine such as a trimmer, a mower or a chain saw usually includes: a motor case portion in which a motor, as the prime mover, is situated; a working portion including clipper blades or similar which are driven by the motor; and a handle portion connected to the motor case portion or the working portion. The handle portion is provided with a front handle and a rear handle for convenience, and a power switch, through which the motor is connected to a power source, is disposed at a portion adjacent to each of both front and rear handles for safety. Power is supplied to the motor only when both power switches are in an ON position. An operation lever or the like is attached to each of both handles to activate both power switches.

When operating a portable working machine such as a trimmer, an operator changes his or her working posture in accordance with the kind of work required to efficiently handle the working machine with respect to the object of the working machine. Generally, an operator grasps the rear handle at the same portion thereof, but the portion of the front handle which is grasped by an operator varies with the kind of work to be done. Therefore, in many cases, the front handle is formed to have a loop grip portion, and any portion of the loop grip may be grasped by an operator to carry out the work.

Many designs have been proposed for the operation lever of the front handle to operate the power switch in such a manner that an operator can change the portion of the grip of the front handle while continuing the work.

Generally, for instance, in a typical design of the handle, a plurality of operation levers (power switches) are mounted around the periphery of the loop front handle, or a loop operation lever is located along the periphery of the loop front handle, as are disclosed in DE-OS 3531059 and 4222318, respectively.

In the handle and the operation lever of the above-mentioned portable working machines, the shape, dimension and arrangement suitable for the operator to handle and operate the working machine are required to be considered. Included, the overall machine is required to be small in order to be portable.

In an operation lever mechanism for a handle in which numerous of operation levers (power switches) are disposed around the above-mentioned conventional loop front handle, the operation levers (power switches) can be operated at numerous grip positions. However, the number of grips is limited, and the position of the grip where the operator grasps may be separated from the position of the operation lever (power switch), thus making it difficult for the operator to handle the operation levers (power switches). Further, the installation of a number of operation levers (power switches) not only increases the number of parts for the operation lever mechanism for the handle, but also makes the construction of the overall handle portion complicated.

In the type of working machine in which the loop operation lever is disposed along the periphery of the loop front handle, there is a problem of uncertainty of the motion of the power source switch due to the deflection of the loop operation lever itself or similar, and it is difficult for an operator to securely control the operation lever mechanism for the handle since the amount operated and the feel of the operation are different from machine to machine due to the differences in what portions of the loop operation lever are operated.

SUMMARY OF THE INVENTION

The present invention solves the above-mentioned problems of a conventional operation lever mechanism for a handle. The object of the present invention is to provide a portable working machine with an improved handle and operation lever for easier handling and operation, especially the shape and structure of the front handle and the operation lever, which is positioned in the vicinity of the front handle.

The operation lever mechanism for a handle of a portable working machine according to the present invention includes: a rotatably supported body; a swingable operation lever pivotally supported by the rotatably supported body; and an operating portion movable in a direction along an axis of the rotatably supported body, the operating portion being connected to a swinging end of the swingable operation lever.

With the construction of the operation lever mechanism for a handle of a portable working machine according to the present invention, when the operation lever, which is situated in the vicinity of the handle, swings clockwise about the pivotal end, for example, to approach the handle, the operating portion, which is connected to the operation lever, slidably moves to the left in the direction of its axis. The movement to the left causes the conical portion or loop flange of the operating portion, for instance, to press an actuator of the electrical switch into the switch, which sets the switch to an ON position.

When the switch is set to an ON position, for example, power is supplied to a direct current or DC motor as a prime mover so as to provide rotational power. The rotational power of the DC motor is transmitted to a gear reciprocating mechanism, for instance in a trimmer, and the gear reciprocating mechanism allows the clipper blades to relatively reciprocate with respect to each other to perform trimming work.

Then, at the initial stage of any work to be performed or in operation, when the operation of the grip portions is difficult since, for instance, the position of the handle grasped by the operator and position of the grip portions of the operation lever are separate from each other, the rotatably supported body is rotated about the axis to move the grip portion of the operation lever to a position adjacent to the position of the handle grasped by the operator where the operator can easily operate it.

BRIEF DESCRIPTION OF THE DRAWINGS

The present invention will be more apparent from the following description with reference to the accompanying drawings wherein.

DETAILED DESCRIPTION OF PREFERRED EMBODIMENTS

Figure 1:
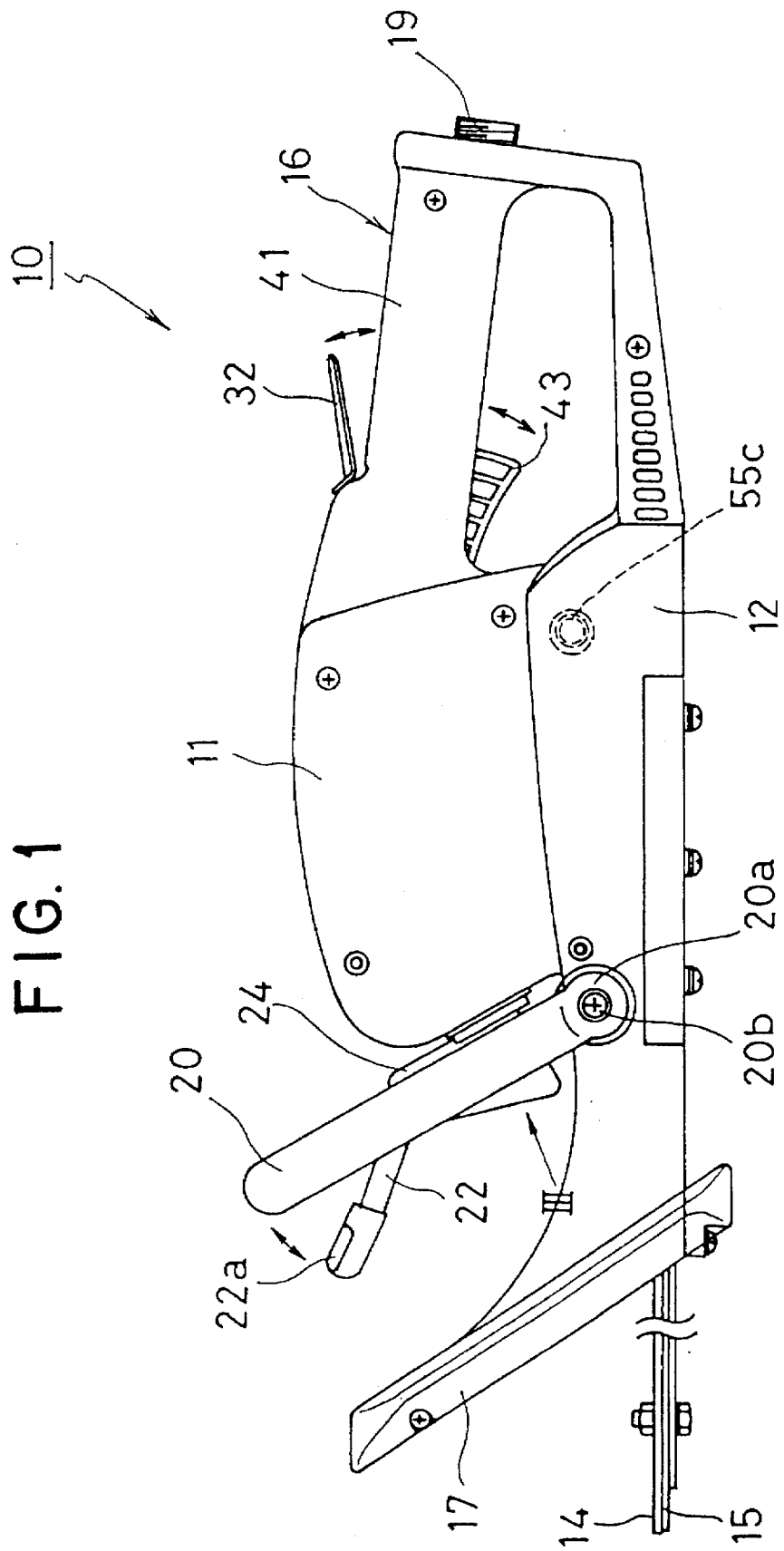
FIG. 1 is an overall side view of a power clipper-type trimmer to which an embodiment of the present invention is applied.

FIGS. 1 to 4 are an overall side view, an inner view, a front view of a primary portion (handle and operation lever) and a perspective view of the primary portion of a power clipper-type trimmer, respectively, as a portable working machine to which an embodiment of the present invention is applied.

The clipper-type trimmer 10 to which an embodiment according to the present is applied invention includes: a motor case 11 in which a direct current or DC motor M of 12 V is installed, for instance, a transmission case 12 in which a gear reciprocating mechanism D, which is driven by the DC motor M and relatively reciprocates to transmit power to a pair of upper and lower clipper blades 14 and 15, is installed; a U-shaped rear handle 16 which is integrally formed with a rear portion of the motor case 11 and a rear portion of the transmission case 12 so as to bridge them; a loop front handle 20 fastened and fixed to the transmission case 12 at the front portion of the motor case 11; and a hand protector 17 disposed at the front portion of the loop front handle 20.

Figure 2:
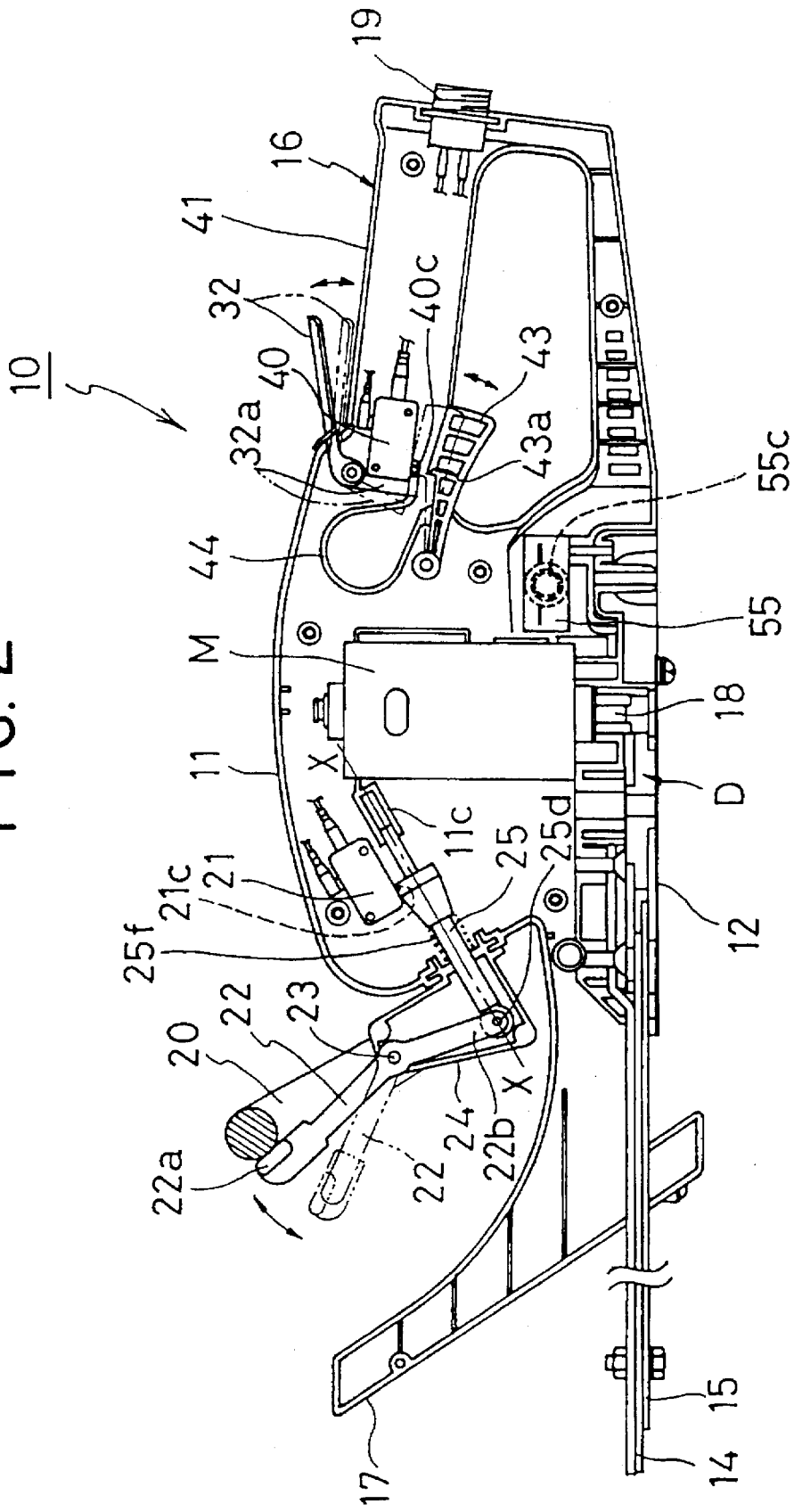
FIG. 2 is an inner view of the trimmer illustrated in FIG. 1.

As illustrated in FIG. 2, the DC motor M is provided with an output shaft which projects downwardly, and the rotational power of the DC motor M is transmitted to the gear reciprocating mechanism D through the output shaft 18 and is further transformed to a linear reciprocating motion so as to be transmitted to the clipper blades 14, 15, which causes the clipper blades 14, 15 to alternately and linearly reciprocate with respect to each other.

A micro switch as a rear switch 40 is situated on the motor case 11 side of a grip portion 41 of the rear handle 16 and a power connector 19 is located at the rear end of the rear handle 16. Another micro switch with the same specification as the above-mentioned microswitch is disposed as a front switch 21 at the upper front of the motor case 11 at the rear portion of the front handle 20. The rear switch 40 and the front switch 21 are activated only when both switches are set to ON positions to supply power to the DC motor M. The rear switch 40 and front switch 21 are constructed as general micro switches so as to be activated only when both actuators 21c and 40c are pressed.

Figure 5:
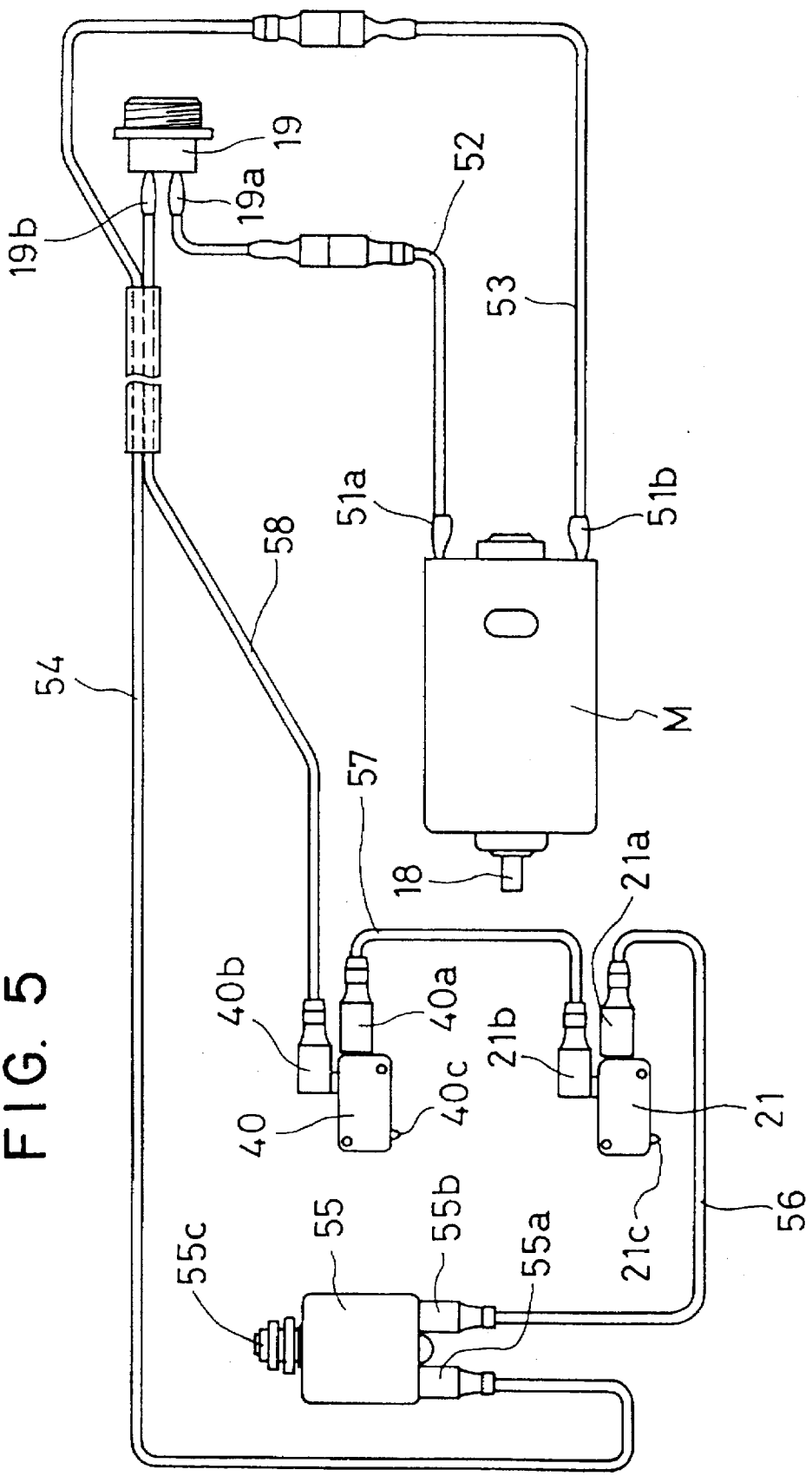
FIG. 5 is a connection diagram of a power supply system for the embodiment shown in FIG. 1.

The connection of the power supply system of the portable working machine including the DC motor M, the rear switch 40 and the front switch 21 as described above are indicated in FIG. 5. Referring to FIG. 5, a terminal 51a of the DC motor M is connected to a terminal 19a of the power connector 19 which is mounted to the rear portion of the rear handle 16 through a wire 52, and another terminal 51b of the DC motor M is connected to a terminal 55a of a circuit protector 55 with a reset button 55c, which is situated in the motor case 11, though wires 53 and 54. Another terminal 55b of the circuit protector 55 is connected with a wire 56 to a terminal 21a of the front switch 21 which is situated in the motor case 11 in the vicinity of the loop front handle 20. Another terminal 21b of the front switch 21 is connected through a wire 57 to a terminal 40a of the rear switch 40 which is located in the rear handle 16 on the motor case 11 side. Further, another terminal 40b of the rear switch 40 is connected to another terminal 19b of the power connector 19 through a wire 58.

The rear switch 40, disposed in the rear handle 16, is activated when a safety lever 32, which is located on the upper side of the grip portion 41 of the rear handle 16 so as to swing, is pushed down by grasping the rear handle 16 and causes a L-shaped actuator block portion 32a, which swings integrally with the safety lever 32, to be removed from the side of the actuator 40c of the rear switch 40 (as illustrated by the two-dot chain lines in FIG. 2). In this state, a rear starter operation lever 43, located on the lower surface side of the grip portion 41 of the rear handle 16, is pushed upward to push the actuator 40c of the rear switch 40 at a pushing portion 43a thereof (as illustrated by the two-dot chain lines in FIG. 2) to set the rear switch 40 to an ON position. Releasing the pushing-down force to the safety lever 32 and the pushing-up force to the rear starter operation lever 43 by releasing the hand from the rear handle 16 allows the rear starter operation lever 43 and the safety lever 32 to return to their original positions (as illustrated by the solid lines in FIG. 2) due to the resilient force of a U-shaped spring portion 44 which is integrally formed with the rear starter operation lever 43, the L-shaped actuator block portion 32a and the safety lever 32. As a result, the actuator 40c of the rear switch 40 also returns to its original state in which it is projecting due to the resilient force of a spring built-in the rear switch 40 so as to be set to an OFF position, and is enclosed by the L-shaped actuator block portion 32a, so that the rear switch 40 is not set to an ON position unless the rear handle 16 is properly grasped and the safety lever 32 is completely depressed.

On the other hand, the front switch 21 situated in the vicinity of the loop front handle 20 is operated by the operation lever 22.

The operation lever 22 is supported by a supporting pin 23 at the central portion so as to swing, and a lower end portion 22b, as a swinging end, is rotatably supported by a supporting pin 25d at the front end portion 25c of an operating portion 25 which presses the actuator 21c of the front switch 21. The rotatably supported body 24 is a hollow box having a trapezoidal shaped cross section. The upper swinging end portion of the operation lever 22 extending from the supporting pin 25d projects from the upper portion of the rotatably supported body 24, and the operating portion 25 projects from the lower rear side surface of the rotatably supported body 24 into the inside of the motor case 11. On the lower rear side surface from which the operating portion 25 projects, an outwardly projecting cylindrical portion 24a is formed, and on the outer periphery of the cylindrical portion 24a, an outer flange 24b is integrally formed with the rotatably supported body 24. On the inner periphery of the cylindrical portion 24a, a loop inner flange 24c is further situated to slidably support the operating portion 25 at the loop inner flange 24c.

At the front portion of the motor case 11 are situated an engagement hole 11a with which the cylindrical portion 24a of the rotatably supported body 24 engages, and a loop engagement channel 11b which is formed on the inner periphery of the engagement hole 11a with which the outer flange 24b of the cylindrical portion 24a engages. This allows the rotatably supported body 24 to be rotatably supported at the front portion of the motor case 11 by engaging the engagement hole 11a and loop engagement channel 11b of the motor case 11 with the cylindrical portion 24a and the outer flange 24b of the rotatably supported body 24, respectively.

The operating portion 25 projecting from the rotatably supported body 24 is introduced to the inner front portion of the motor case 11. At the intermediate portion of the operating portion 25 is provided a conical portion 25a. At the tip, of the operating portion 25, is formed as a slidable shaft 25b which is slidably and rotatably supported in the direction of the axis X—X of the operating portion 25 by a bearing portion 11c in the motor case 11.

On the upper portion of the conical portion 25a of the operating portion 25 is situated the front switch 21, and the actuator 21c of the front switch 21 opposes the conical portion 25a. At the position shown by solid lines in FIGS. 2 and 4, the actuator 21c of the front switch 21 is pressed by the conical portion 25a of the operating portion 25 so that the actuator 21c is drawn back in the front switch 21, causing the front switch 21 to be set to an ON position. When the operation lever 22 swings counterclockwise to the position indicated by two-dot chain lines from the state shown by the solid lines in FIGS. 2 and 4, the conical portion 25a of the operating portion 25 also moves to the right position shown by two-dot chain lines. At this moment, the conical portion 25a is formed so as to have a smaller diameter at the left thereof, the pushing force to the actuator 21c of the front switch 21 is released, which allows the actuator 21c to project from the front switch 21, resulting in an OFF position of the front switch 21.

Figure 3:
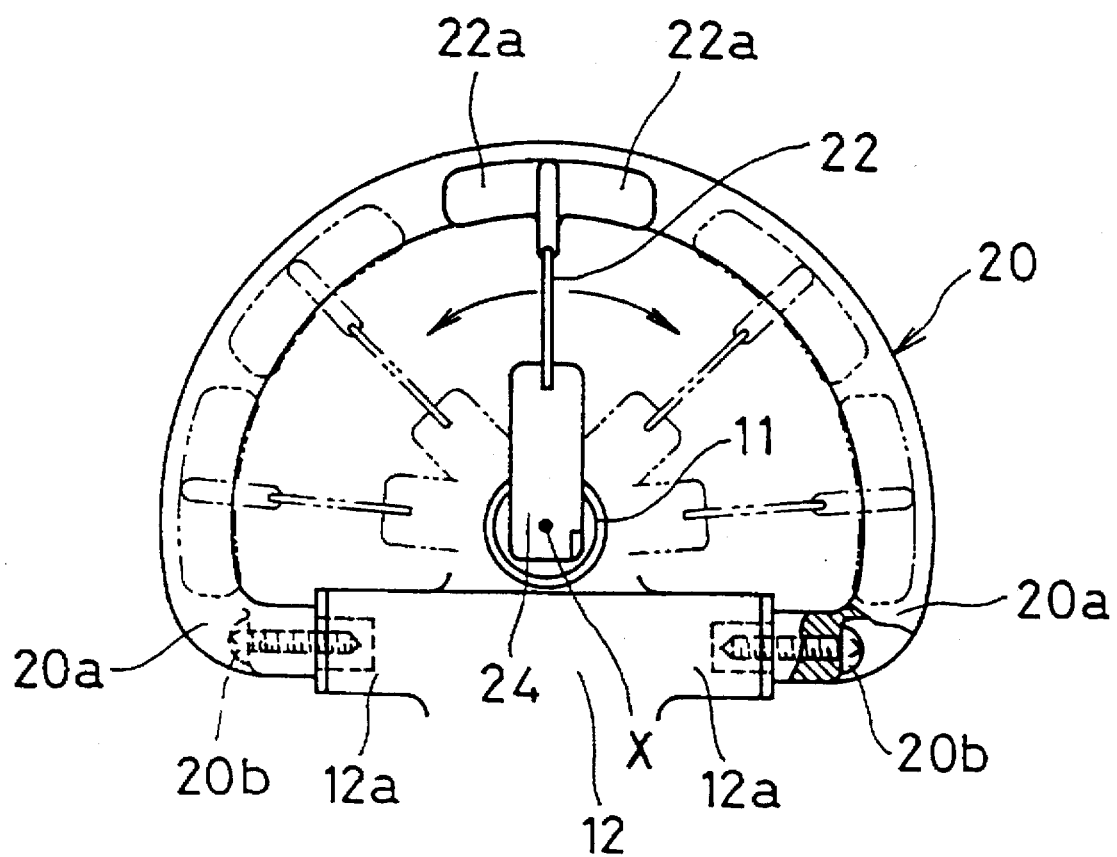
FIG. 3 is a cross-sectional view of a primary portion of a loop handle and an operation lever of the trimmer shown in FIG. 1 which is observed in the direction indicated by the arrow III.

The loop front handle 20 has the shape of a semicircular arch as illustrated in FIG. 3, and both lower end portions 20a thereof are fastened and fixed to both receiving portions 12a of the transmission case 12 by fastening screws An imaginary center X of the arch of the loop front handle 20 coincides with the axis X—X of the operating portion 25 and at the same time, the rotatably supported body 24 is situated in a space in the arch of the loop front handle 20 to rotatably be supported about the axis X—X on the motor case 11.

At the upper end of the operation lever 22, grip portions 22a, extending to the right and left in FIG. 3, are integrally formed with the operation lever 22 along the arch shape of the loop front handle 28, and the rotatably supported body 24 is rotatably supported about the axis X—X, so that the operation lever 22 is also rotatable together with the rotatably supported body 24. As a result, the rotation of the rotatably supported body 24 allows the position of the operation lever 22 to be changed at arbitrary angles along the arch of the loop front handle 20. Therefore, regardless of the angle of the loop front handle 20 grasped by the operator, he or she swings the grip portion 22a together with the loop front handle 20 by his or her figure to make the operation of the operation lever 22 easy, which allows the rotatably supported body 24 to be rotatable about the axis X—X to freely adjust the angle of the operation lever 22.

Figure 4:
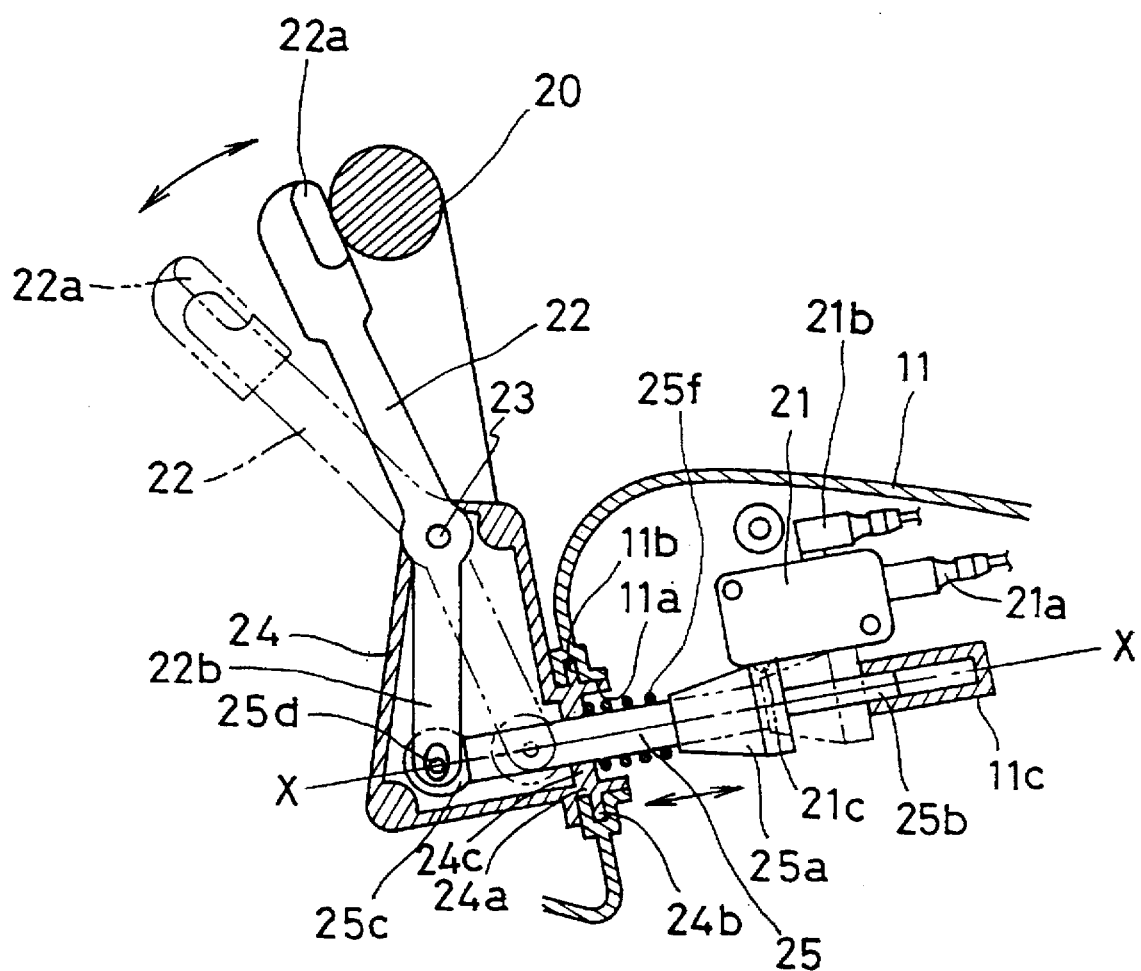
FIG. 4 is an enlarged cross-sectional view of the operation lever mechanism shown in FIG. 1.

Reference symbol 25f in FIGS. 2 and 4 is a compressive coil spring for separating the grip portions 22a from the loop front handle 20 when the operation lever mechanism for a handle is not operated. The compressive coil spring 25f urges the operating portion 25 to the right to maintain it out of operation.

Next, the motion of the operation lever mechanism for the handle according to the above-mentioned embodiment will be explained.

The operation lever 22, safety lever 32 and rear starter operation lever 43 of the clipper-type trimmer 10, under the condition illustrated in FIG. 1 are in a state in which the front switch 21 and the rear switch 40 are in an OFF position, so that power is not supplied to the DC motor M, that is, the DC motor M is out of operation.

In the state described above, the operator grasps the loop front handle 20 of the clipper-type trimmer 10 by one hand thereof, and another hand of the operator grasps the grip portion 41 of the rear handle 16. Further, after the operator releases the safety control of the actuator 40c of the rear switch 40 by pressing it by his or her palm, pressing the rear starter operation lever 43 by a forefinger thereof or similar causes the actuator 40c of the rear switch 40 to be drawn back into the rear switch 40, which sets the rear switch 40 to an ON position.

When the grip portions 22a of the operation lever 22 situated close to the loop front handle 20 are grasped by the operator together with the loop front handle 20 at anytime before, during or after the above-mentioned operation, the operation lever 22 is rotated about the supporting pin 23 of the rotatably supported body 24. As a result, the operation lever 22 swings from the position shown by two-dot chain lines to a position shown by the solid lines in FIGS. 2 and 4, so that the operating portion 25 also moves to the position illustrated by solid lines which is on the left side with respect to the axis X—X. Then, the movement of the operating portion 25 toward the left causes the conical portion 25a of the operating portion 25 to press the actuator 21c of the front switch 21, which allows the actuator 21c to be drawn back in the front switch 21, resulting in an ON position of the front switch 21.

Power is not supplied to the DC motor M, that is, the DC motor M does not rotate until the rear switch 40 as well as the front switch 21 are set to an ON position respectively. The rotational power of the DC motor M is transmitted to the gear reciprocating mechanism D, which causes the clipper blades 14 and 15 to reciprocate with inverse phases with respect to each other for trimming.

Then, at the time of the initial startup of the working machine or during its operation, when it is difficult to grasp the grip portions 22a because, for instance, the position of the loop front handle 20 grasped by the operator and the position of the grip portions 22a of the operation lever 22 extending right and left are separated from each other, the operation lever 22 is rotated about the axis X—X together with the rotatably supported body 24 to move the grip portion 22a of the operation lever 22 to a position adjacent to the position of the loop front handle 20 grasped by the operator where the operator can easily operate it.

The operator is able to automatically adjust the rotated position in accordance with the movement of the hand along the loop of the loop front handle 20 by grasping the upper portion of the operation lever 22 between the two figures grasping the loop front handle 20.

An embodiment of the present invention is described above, however, this invention is not limited to the above-mentioned embodiment, and it may be possible to change the design without departing from the concept of the claimed invention.

Figure 6:
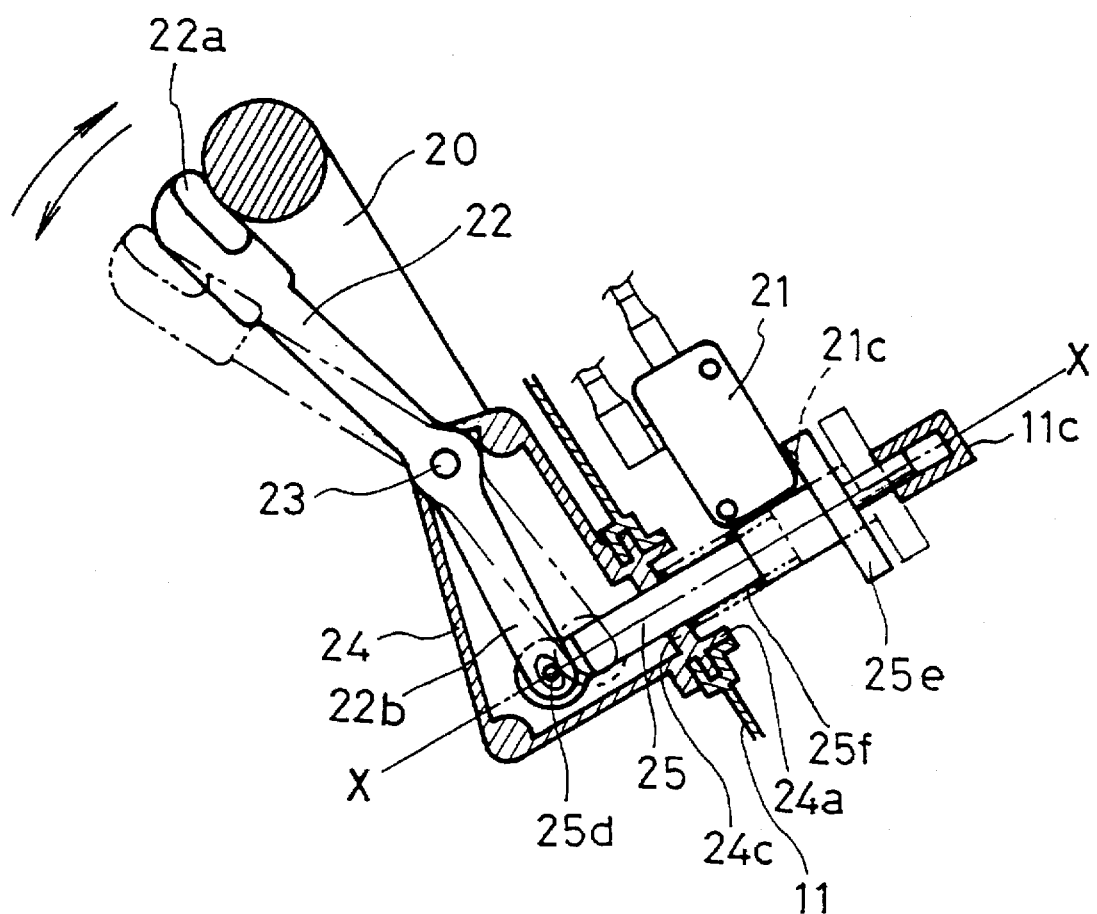
FIG. 6 is an enlarged cross-sectional view of the operation lever mechanism of another embodiment of the present invention.

For example, in the above embodiment, the operation of the front switch 21 is carried out by pressing the actuator 21c of the front switch 21 through the conical portion 25a of the operating portion 25. However, as illustrated in FIG. 6, the front switch 21 is located at a position where the front switch 21 in the above-mentioned embodiment is rotated counterclockwise by 90 degrees, and at the same time, the loop flange 25e is attached to the operating portion 25 in place of the conical portion 25a to cause the operating portion 25 to slide right and left along the axis X—X, which makes it possible to press the actuator 21c of the front switch 21 or release the pushing force to the actuator 21c through the side surface of the loop flange 25e to set the front switch 21 to ON or OFF positions.

In this case, the operating portion 25 is always urged to be in the condition that the operating portion 25 is in a switched-OFF position, that is, toward the right by mounting the compressive coil spring 25f between the loop inner flange 24c of the cylindrical portion 24a of the rotatably supported body 24 and an intermediate engaging portion of the operating portion 25. When an operator release his or her hand from the operation lever 22 at the position indicated by solid lines at a switched-ON condition, the operation lever 22 automatically moves to the position shown by two-dot chain lines.

Further, in the above-mentioned embodiment, the explanation was made when the present invention was applied to a power clipper-type trimmer. However, the operation lever for a handle according to the present invention may be applied to other portable working machines such as a chain saw with an internal combustion engine and operation levers used for emergency halting devices or similar.

The operation lever according to the present invention is usable, not only for the power source switch described above but for a breaking means, such as an electrical switch of spark ignition device for shortening and engine throttle nullificating means.

As described above, in this invention, an operation lever mechanism for a loop handle includes a rotatably supported body which is rotatably supported and an operation lever pivotally supported by the rotatably supported body, and the axis for rotation of the rotatably supported body is positioned so as to pass the center or a position adjacent to the center of the virtual center of the loop handle. As a result, the grip portion of the operation lever may move along the grip portion of the loop handle, and regardless of the position of the grip portion of the operation lever grasped by the operator, he or she can easily operate the operation lever at the position of the grip portion, which eliminates abnormal operation or motion due to the change of the grasped portion.

Further, since the grip portion of the operation lever rotates or moves along the grip portion of the loop handle, it is not necessary to provide a plurality of operating portions or switches along the loop of the loop handle.

What is claimed is:

1. An operation lever mechanism for a handle comprising:
   a rotatably supported body;
   a swingable operation lever pivotally supported by said rotatably supported body;
   an operating portion movable axially in a direction along an axis of said rotatably supported body, said operating portion connected to a swinging end of said swingable operation lever, wherein said axis of said rotatably supported body is situated to encompass an imaginary center of an arch of a loop handle; and
   grip portions of a second swinging end of said swingable operation lever rotate and move along said arch of said loop handle.

2. The operation lever mechanism for a handle according to claim 1, wherein said operating portion is provided with any one of a conical portion and a loop flange and said operating portion moves axially along the axis of rotation of either said conical portion or said loop flange to activate a switch.

3. The operation lever mechanism for a handle according to claim 1, wherein said swingable operation lever is pivotally supported by said rotatably supported body in a direction in which said swingable operation lever is closest to or farthest separated from said loop handle.

4. The operation lever mechanism for a handle according to claim 1, wherein said loop handle is a front handle of a working machine.

5. An operation lever mechanism for a handle comprising:
   an operation lever including an upper and lower end portion and a middle portion having an aperture therethrough, wherein said aperture houses a supporting pin around which said operation lever, partially mounted within a rotatably supported body, rotates through a limited angle and wherein said rotatably supported body is a housing enclosing said middle portion and said lower end portion of said operation lever; and
   an operating means having a first end connected to said lower end portion of said operation lever for translation back and forth along a longitudinal axis of said operating means as said operation lever rotates through said limited angle, wherein said first end of said operating means is connected to said lower end portion via a supporting pin and wherein said operating means has a second end that abuts against a compressive coil spring.

6. The operation lever mechanism for a handle according to claim 5, wherein said handle is a loop front handle.

7. The operation lever mechanism for a handle according to claim 6, wherein said rotatably supported body has an axis which encompasses an imaginary center of an arch of said loop front handle.

8. The operation lever mechanism for a handle according to claim 7, wherein said upper end portion of said operation lever includes a grip portion.

9. The operation lever mechanism for a handle according to claim 8, wherein said grip portion rotates and moves along said arch of said loop front handle.

10. The operation lever mechanism for a handle according to claim 9, wherein said compressive coil spring abuts against a loop flange.

11. The operation lever mechanism for a handle according to claim 10, wherein said loop flange has an outwardly projecting flange means for actuating an actuator of a front switch which said flange means comes into contact with during translation of said operating means.

12. The operation lever mechanism for a handle according to claim 11, wherein said compressive coil spring abuts against a conical portion.

13. The operation lever mechanism for a handle according to claim 12, wherein said conical portion has an outwardly projecting means for actuating an actuator of a front switch which said outwardly projecting means comes into contact with during translation of said operating means.

14. The operation lever mechanism for a handle according to claim 11, wherein said operation lever is pivotally supported in a direction that is closest to or farthest separated from said loop front handle.

15. The operation lever mechanism for a handle according to claim 13, wherein said operation lever is pivotally supported in a direction that is closest to or farthest separated from said loop front handle.

16. The operation lever mechanism for a handle according to claim 14, wherein said loop front handle is a front handle of a working machine.

17. The operation lever mechanism for a handle according to claim 15, wherein said loop front handle is a front handle of a working machine.

* * * * *